US012306563B2

(12) United States Patent
Saeki

(10) Patent No.: US 12,306,563 B2
(45) Date of Patent: May 20, 2025

(54) FIXING DEVICE WITH A HEATER HOLDER HAVING A RETRACTION PORTION

(71) Applicant: TOSHIBA TEC KABUSHIKI KAISHA, Tokyo (JP)

(72) Inventor: Ryota Saeki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 18/104,811

(22) Filed: Feb. 2, 2023

(65) Prior Publication Data

US 2023/0176511 A1 Jun. 8, 2023

Related U.S. Application Data

(63) Continuation of application No. 17/680,395, filed on Feb. 25, 2022, now Pat. No. 11,599,049, which is a (Continued)

(30) Foreign Application Priority Data

Aug. 7, 2018 (JP) ................................ 2018-148782

(51) Int. Cl.
*G03G 15/20* (2006.01)
*G03G 21/16* (2006.01)
*G03G 21/20* (2006.01)

(52) U.S. Cl.
CPC ..... *G03G 15/2053* (2013.01); *G03G 15/2017* (2013.01); *G03G 21/1685* (2013.01); *G03G 21/20* (2013.01); *G03G 2215/2035* (2013.01)

(58) Field of Classification Search
CPC ........... G03G 15/2017; G03G 15/2053; G03G 21/1685; G03G 21/20; G03G 2215/2035
See application file for complete search history.

(56) References Cited

U.S. PATENT DOCUMENTS 6,049,064 A 4/2000 Natsuhara et al.
7,424,260 B2 9/2008 Nishiyama et al.
(Continued)

FOREIGN PATENT DOCUMENTS

JP 7-191561 7/1995
JP 11-249465 9/1999
(Continued)

OTHER PUBLICATIONS

Non-Final Office Action for U.S. Appl. No. 16/451,173 mailed Feb. 19, 2020.
(Continued)

*Primary Examiner* — Joseph S Wong
(74) *Attorney, Agent, or Firm* — Amin, Turocy & Watson, LLP

(57) ABSTRACT

According to one embodiment, a fixing device includes a belt, a heater, and a holder. The holder has a plurality of support portions that contact an end of the first heating region and an end of the second heating region along the direction perpendicular to the transport direction, and a plurality of non-contacting portions that do not contact the end of the first heating region and the end of the second heating region between the plurality of support portions, the end of the second heating region contacts one of the plurality of support portions at a side in the direction perpendicular to the transport direction, and the end of the second heating region faces to one of the plurality of non-contacting portions at the other side in the direction perpendicular to the transport direction.

20 Claims, 9 Drawing Sheets

Related U.S. Application Data continuation of application No. 17/142,280, filed on Jan. 6, 2021, now Pat. No. 11,262,679, which is a continuation of application No. 16/451,173, filed on Jun. 25, 2019, now Pat. No. 10,915,049.

(56) References Cited

U.S. PATENT DOCUMENTS

| | | | | |
|---|---|---|---|---|
| 11,262,679 | B2 | 3/2022 | Saeki | |
| 2004/0129696 | A1* | 7/2004 | Doi | G03G 15/2053 219/619 |
| 2006/0045589 | A1 | 3/2006 | Iwasaki et al. | |
| 2009/0263168 | A1* | 10/2009 | Baba | G03G 15/2053 399/329 |
| 2014/0072352 | A1* | 3/2014 | Naito | G03G 15/2053 399/329 |
| 2014/0076878 | A1 | 3/2014 | Shimura | |
| 2015/0139706 | A1 | 5/2015 | Fujiwara et al. | |
| 2016/0202649 | A1 | 7/2016 | Asaka et al. | |
| 2017/0010571 | A1* | 1/2017 | Matsuda | G03G 15/2053 |
| 2017/0212457 | A1 | 7/2017 | Ishigaya et al. | |

FOREIGN PATENT DOCUMENTS

| | | |
|---|---|---|
| JP | 2004-77993 | 3/2004 |
| JP | 2009-64658 | 3/2009 |
| JP | 2016-133638 | 7/2016 |
| JP | 2016-161849 | 9/2016 |
| JP | 2017-174644 | 9/2017 |

OTHER PUBLICATIONS

Final Office Action for U.S. Appl. No. 16/451,173 mailed May 19, 2020.

Extended European Search Report for European Patent Application No. 19190214.7 mailed Dec. 18, 2019.

Non-Final Office Action for U.S. Appl. No. 17/142,280 mailed Jul. 21, 2021.

Japanese Office Action for Japanese Patent Application No. 2018-148782 mailed Mar. 25, 2022.

Non-Final Office Action for U.S. Appl. No. 17/680,395 mailed Jul. 29, 2022.

* cited by examiner

FIXING DEVICE WITH A HEATER HOLDER HAVING A RETRACTION PORTION

CROSS-REFERENCE TO RELATED APPLICATIONS

This application is a Continuation of application Ser. No. 17/680,395 filed on Feb. 25, 2022, which is a Continuation of application Ser. No. 17/142,280 filed on Jan. 6, 2021, now U.S. Pat. No. 11,262,679, which is a Continuation of application Ser. No. 16/451,173 filed on Jun. 25, 2019, now U.S. Pat. No. 10,915,049, the entire contents of all of which are incorporated herein by reference.

This application is based upon and claims the benefit of priority from Japanese Patent Application No. 2018-148782, filed Aug. 7, 2018, the entire contents of which are incorporated herein by reference.

FIELD

Embodiments described herein relate generally to a fixing device and an image forming apparatus.

BACKGROUND

In the related art, there is known a fixing device for fixing an image on paper by a heated fixing belt. In such a fixing device, in order to heat the fixing belt, a heater including a heat generating resistor layer provided on a substrate may be used. The length of the heater is determined according to the largest paper that can be passed through the fixing device. Therefore, when small size paper is passed, the end of the heater may be a portion out of the paper passing range of the paper (outer portion of the resistor layer). The heat of the heat generating resistor layer is absorbed by the paper through the fixing belt during continuous paper passing, but the heat of the outer portion of the resistance layer is not absorbed. Accordingly, the temperature at the end of the heater corresponding to the outer side of the resistance layer in the heater becomes high.

When the temperature of the end of the heater becomes high, there is a possibility that the temperature may exceed the heat resistance temperature of the holder holding the heater in contact with the heater. That is, there is a possibility that the holder may be melted and deformed. Therefore, it is considered to take measures such as lowering the paper passing speed, widening the interval of paper sheets, and cooling the fixing belt and the press roller with an external cooler. However, such measures have problems that the performance of an image forming apparatus is lowered or the structure is complicated and the cost is increased due to an increase in the number of parts.

DETAILED DESCRIPTION

Embodiments provide a fixing device and an image forming apparatus capable of preventing a temperature rise in a holder that holds a heater while preventing an increase in the number of parts.

In general, according to one embodiment, a fixing device includes a belt, a heater, and a holder. The belt is formed into a cylindrical shape, is rotated in a circumferential direction to transport a sheet, and applies heat to the sheet. The heater is arranged on an inner side of the belt and extends in a predetermined longitudinal direction to heat the belt. The holder extends in the longitudinal direction of the heater and holds the heater. The holder includes a support portion and a retraction portion. The support portion comes into contact with the heater and supports the heater. The retraction portion is provided at a position avoiding the support portion in the longitudinal direction of the heater, and includes a smaller contact area with the heater than the contact area between the support portion and the heater or does not come into contact with the heater.

Hereinafter, a fixing device and an image forming apparatus according to embodiments will be described with reference to the drawings.

Figure 1:
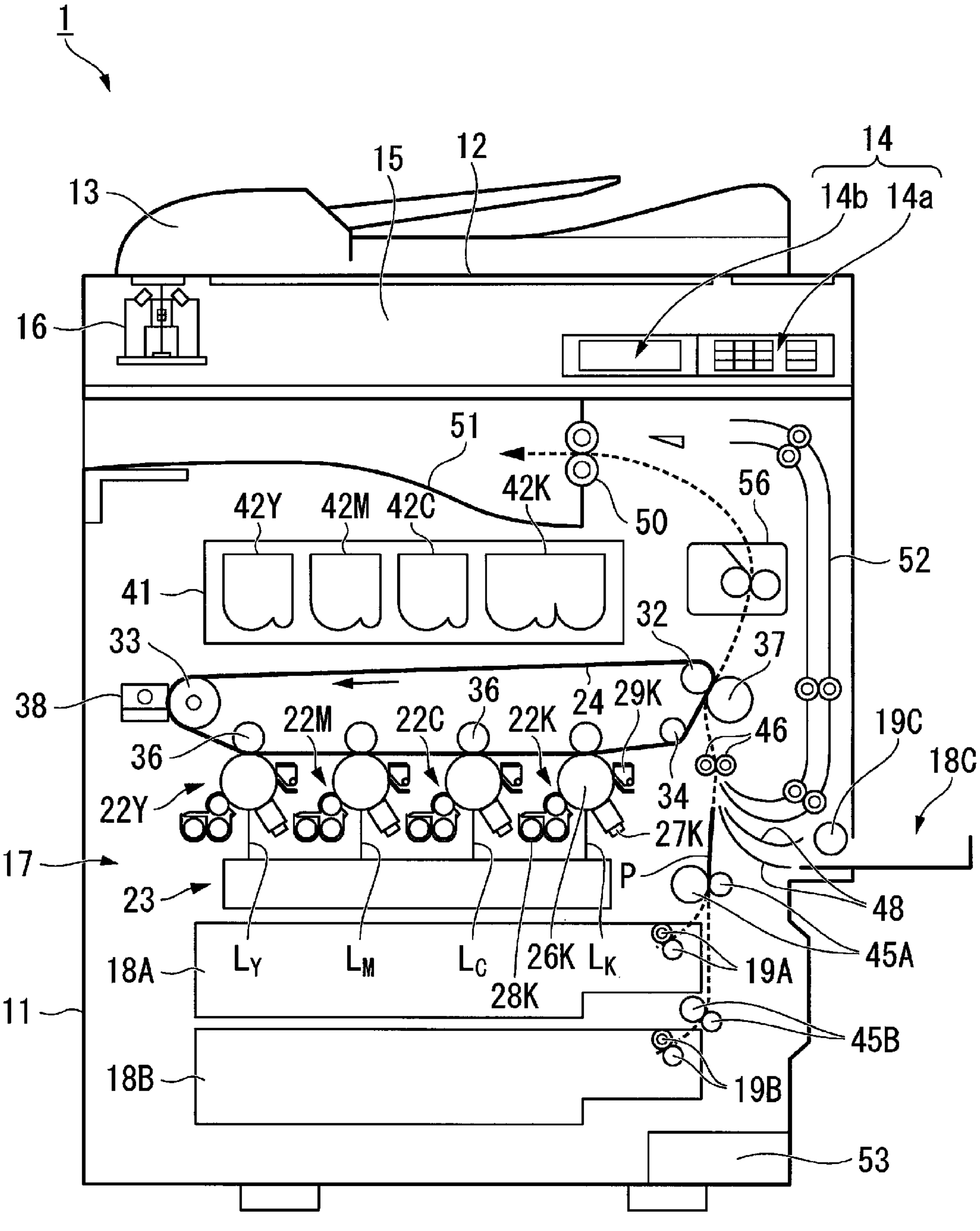
FIG. 1 is a schematic view illustrating an example of an overall configuration of an image forming apparatus according to an embodiment.

FIG. 1 is a schematic view illustrating an example of an overall configuration of an image forming apparatus 1 according to an embodiment.

In FIG. 1, the image forming apparatus 1 is, for example, a multi-function peripheral (MFP), which is a composite equipment, a printer, or a copying machine. In the following description, a case where the image forming apparatus 1 is the MFP is described as an example.

The configuration of the image forming apparatus 1 is not particularly limited. For example, the image forming apparatus 1 includes a main body 11. A document table 12 including transparent glass is provided on an upper portion of the main body 11. An automatic document transport unit (ADF) 13 is provided on the document table 12. An operation unit 14 is provided on the upper portion of the main body 11. The operation unit 14 includes an operation panel **14*a* including various keys and a touch panel type operation and display unit 14*b***.

A scanner unit 15 is provided in a lower portion of the ADF 13. The scanner unit 15 reads a document sent by the ADF 13 or a document placed on the document table 12. The scanner unit 15 generates image data of the document. For example, the scanner unit 15 includes an image sensor 16. For example, the image sensor 16 may be a contact image sensor. The image sensor 16 moves along the document table 12 when reading the image of the document placed on the document table 12.

A sheet feeding cassette 18A (18B) includes a sheet feeding mechanism 19A (19B). The expression "A sheet feeding cassette 18A (18B) includes a sheet feeding mechanism 19A (19B)" means both of, the sheet feeding cassette 18A includes the sheet feeding mechanism 19A, and the sheet feeding cassette 18B includes the sheet feeding mechanism 19B. The same applies to the following description.

The sheet feeding mechanism 19A (19B) takes out sheets (sheet-like recording media such as paper) P one by one from the sheet feeding cassette 18A (18B) and sends the sheets to a sheet P transport path. For example, in the sheet feeding mechanism 19A (19B), a pickup roller, a separation roller, and a sheet feeding roller may be included.

A manual sheet feeding unit 18C includes a manual sheet feeding mechanism 19C. The manual sheet feeding mechanism 19C takes out sheets P from the manual sheet feeding unit 18C and sends the sheets to the sheet transport path.

A printer unit (image forming unit) 17 forms an image on the sheet P based on image data read by the scanner unit 15 or image data generated by a personal computer or the like. The printer unit 17 is, for example, a color printer of a tandem type.

The printer unit 17 includes image forming units 22Y, 22M, 22C, and 22K of each color of yellow (Y), magenta (M), cyan (C) and black (K) corresponding to color separation components of a color image, an exposure device 23, and an intermediate transfer belt 24. In the embodiment, the printer unit 17 includes four image forming units 22Y, 22M, 22C, and 22K.

The configuration of the printer unit 17 is not limited to this configuration and the printer unit may include 2 or 3 image forming units or the printer unit may include 5 or more image forming units.

The image forming units 22Y, 22M, 22C, and 22K are arranged below the intermediate transfer belt 24. The image forming units 22Y, 22M, 22C, and 22K are arranged in parallel below the intermediate transfer belt 24 from an upstream side to a downstream side in a movement direction (in a direction from a left side to a right side in the drawing).

Although not illustrated in the drawing, the exposure device 23 includes a light source, a polygon mirror, an f-θ lens, a reflection mirror, and the like. The exposure device 23 emits exposure light LY, LM, LC, and LK to the surface of a photoconductor 26K or the like, which will be described later, of the image forming units 22Y, 22M, 22C, and 22K based on the image data respectively. The exposure device 23 may be configured to generate a laser scanning beam as exposure light. The exposure device 23 may be configured to include a solid scanning element such as an LED that generates exposure light.

The configurations of each of the image forming units 22Y, 22M, 22C, and 22K are common to each other except for the color of the toner. As the toner, any of normal color toner and decolorable toner may be used. Here, the decolorable toner is a toner which becomes transparent when heated at a certain temperature or higher. The image forming apparatus 1 may be an image forming apparatus in which the decolorable toner can be used or may be an image forming apparatus in which the decolorable toner cannot be used.

Hereinafter, a configuration common to each of the image forming units 22Y, 22M, 22C, and 22K will be described with an example of the image forming unit 22K.

Figure 2:
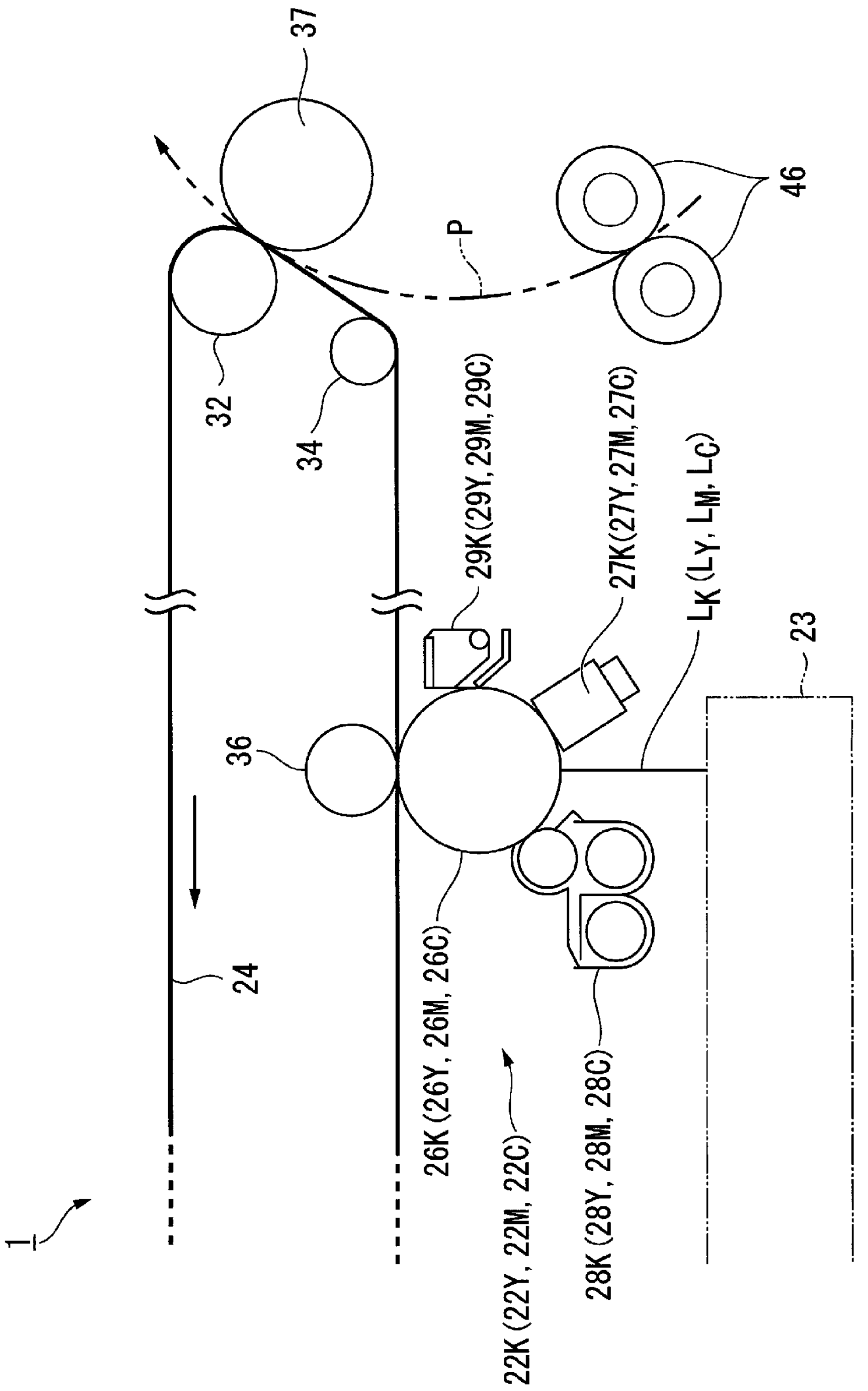
FIG. 2 is a schematic view illustrating a part of the image forming apparatus in an enlarged manner.

FIG. 2 is a schematic view illustrating a part of the image forming apparatus 1 according to the embodiment in an enlarged manner.

As illustrated in FIG. 2, the image forming unit 22K includes the photoconductor 26K, a charger 27K, a developer unit 28K, and a cleaner 29K. In FIG. 1, only in the image forming unit 22K, reference symbols of the photoconductor 26K, the charger 27K, the developer unit 28K, and the cleaner 29K are illustrated.

As illustrated in FIG. 2, the photoconductor 26K is formed into a drum shape. On the surface of the photoconductor 26K, an electrostatic latent image is formed by the exposure light LK. The charger 27K charges the surface of the photoconductor 26K. The developer unit 28K supplies toner to the surface of the photoconductor 26K and develops the electrostatic latent image. The cleaner 29K cleans the surface of the photoconductor 26K.

As illustrated in FIG. 1, the intermediate transfer belt 24 is an endless belt. The intermediate transfer belt 24 is wound around by a secondary transfer backup roller 32, a cleaning backup roller 33, and a tension roller 34. In this example, as the secondary transfer backup roller 32 is rotationally driven, the intermediate transfer belt 24 circulates (rotates) in a direction indicated by the arrow in FIG. 1.

In the vicinity of the intermediate transfer belt 24, a primary transfer roller 36, a secondary transfer roller 37, and a belt cleaning mechanism 38 are arranged.

As illustrated in FIG. 2, the primary transfer roller 36 forms a primary transfer nip with the intermediate transfer belt 24 sandwiched between the primary transfer roller and the photoconductor 26K or the like. A power supply (not illustrated) is connected to the primary transfer roller 36 and at least one of a predetermined direct current voltage (DC) and an alternating current voltage (AC) is applied to the primary transfer roller 36.

The secondary transfer roller 37 forms a secondary transfer nip with the intermediate transfer belt 24 sandwiched between the secondary transfer roller and the secondary transfer backup roller 32. In a manner similar to the primary transfer roller 36, a power supply (not illustrated) is also connected to the secondary transfer roller 37. At least one of a predetermined direct current voltage and an alternating current voltage is applied to the secondary transfer roller 37.

The belt cleaning mechanism 38 includes a cleaning brush that is provided so as to be in contact with the intermediate transfer belt 24, and a cleaning blade (the corresponding reference symbols are not illustrated). A waste toner transfer hose (not illustrated) extending from the belt cleaning mechanism 38 is connected to an entrance portion of a waste toner container (not illustrated).

As illustrated in FIG. 1, a supply unit 41 is arranged above each of the image forming unit 22Y, 22M, 22C, and 22K.

The supply unit 41 supplies toners to each of the image forming units 22Y, 22M, 22C, and 22K, respectively. The supply unit 41 includes toner cartridges 42Y, 42M, 42C, and 42K. The toner cartridges 42Y, 42M, 42C, and 42K respectively store toners of yellow, magenta, cyan, and black.

In each of the toner cartridges 42Y, 42M, 42C, and 42K, a marker unit (not illustrated) that causes a main control unit 53 to be described later to detect the kind of toner stored in each of the toner cartridges is provided. The marker unit includes at least information of toner colors of each of the toner cartridges 42Y, 42M, 42C, and 42K, and information for identifying whether the toner is a normal toner or a decolorable toner.

A supply path (not illustrated) is provided between each of the toner cartridges 42Y, 42M, 42C, and 42K and each of the developer units 28Y, 28M, 28C, and 28K. Through this supply path, the toner is supplied from each of the toner cartridges 42Y, 42M, 42C, and 42K to each of the developer units 28Y, 28M, 28C, and 28K.

On a transfer path from the sheet feeding cassette 18A to the secondary transfer roller 37, a sheet feeding roller 45A and a registration roller 46 are provided. The sheet feeding roller 45A transfers the sheet P taken out from the sheet feeding cassette 18A by the sheet feeding mechanism 19A.

The registration roller 46 adjusts the position of the leading end of the sheet P that is fed from the sheet feeding roller 45A at the contact position thereof. The registration roller 46 transports the sheet P to the secondary transfer nip.

On a transfer path from the sheet feeding cassette 18B to the sheet feeding roller 45A, a sheet feeding roller 45B is provided. The sheet feeding roller 45B transports the sheet P taken out from the sheet feeding cassette 18B by the sheet feeding mechanism 19B to the sheet feeding roller 45A.

A transport path is formed by a transport guide 48 between the manual sheet feeding mechanism 19C and the registration roller 46. The manual sheet feeding mechanism 19C transports the sheet P taken out from the manual sheet feeding unit 18C to the transport guide 48. The sheet P moving along the transport guide 48 reaches the registration roller 46.

On the downstream side of the secondary transfer roller 37 in the transport direction of the sheet P (the upstream side in the drawing), a fixing unit (fixing device) 56 of the embodiment is arranged.

On the downstream side of the fixing unit 56 in the transport direction of the sheet P (the upper left side in the drawing), a transport roller 50 is arranged. The transport roller 50 discharges the sheet P to the sheet discharge unit 51.

On the upstream side of the fixing unit 56 in the transport direction of the sheet P (the right side in the drawing), a reverse transport path 52 is arranged. In the reverse transport path 52, the sheet P is reversed and is guided to the secondary transfer roller 37. The reverse transport path 52 is used when duplex printing is performed.

The image forming apparatus 1 includes the main control unit 53 that controls the entire image forming apparatus 1. The main control unit 53 includes a central processing unit (CPU), a memory, and the like.

Next, the fixing unit 56 will be described in detail.

Figure 3:
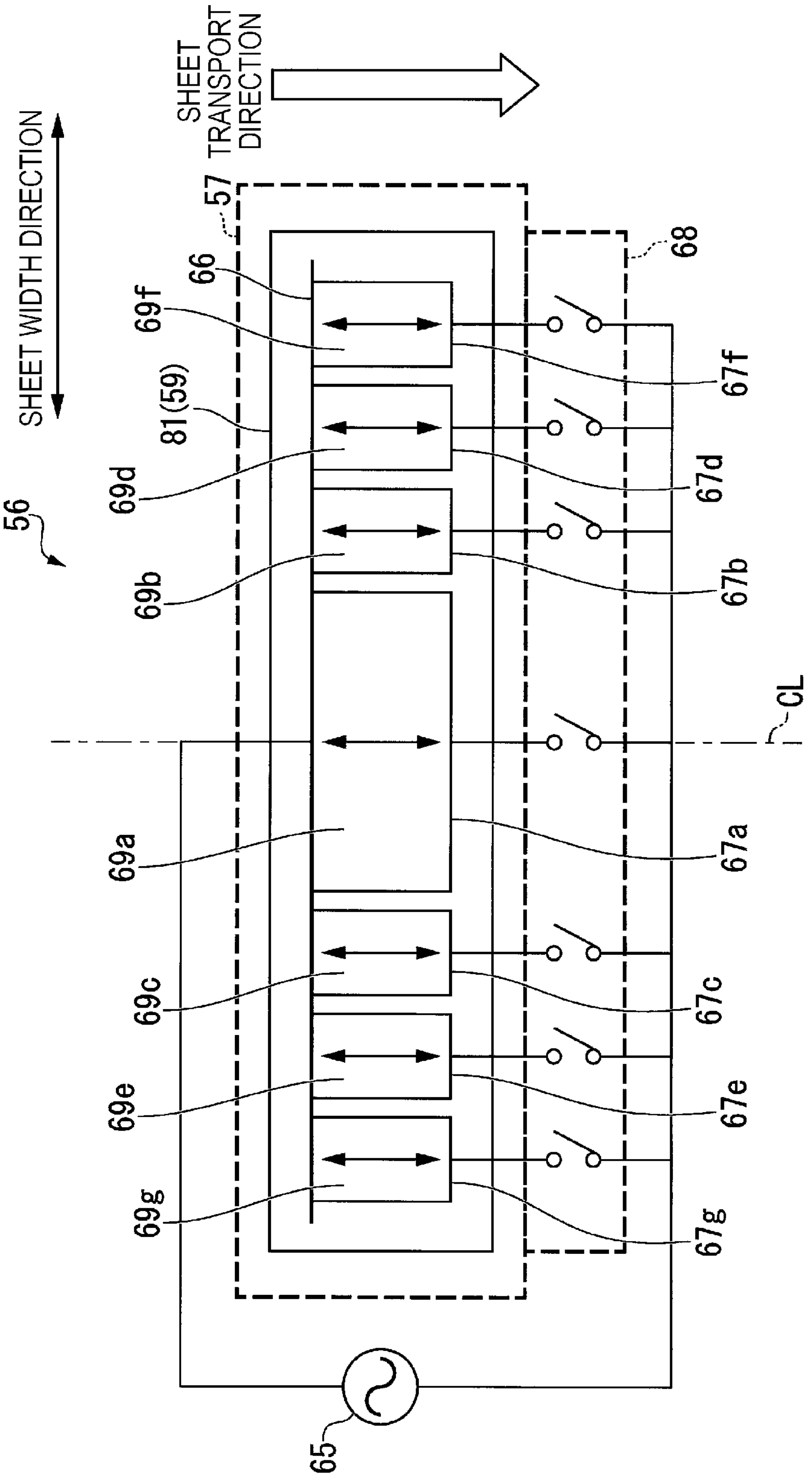
FIG. 3 is a schematic view illustrating a configuration example of a fixing device according to an embodiment.
Figure 4:
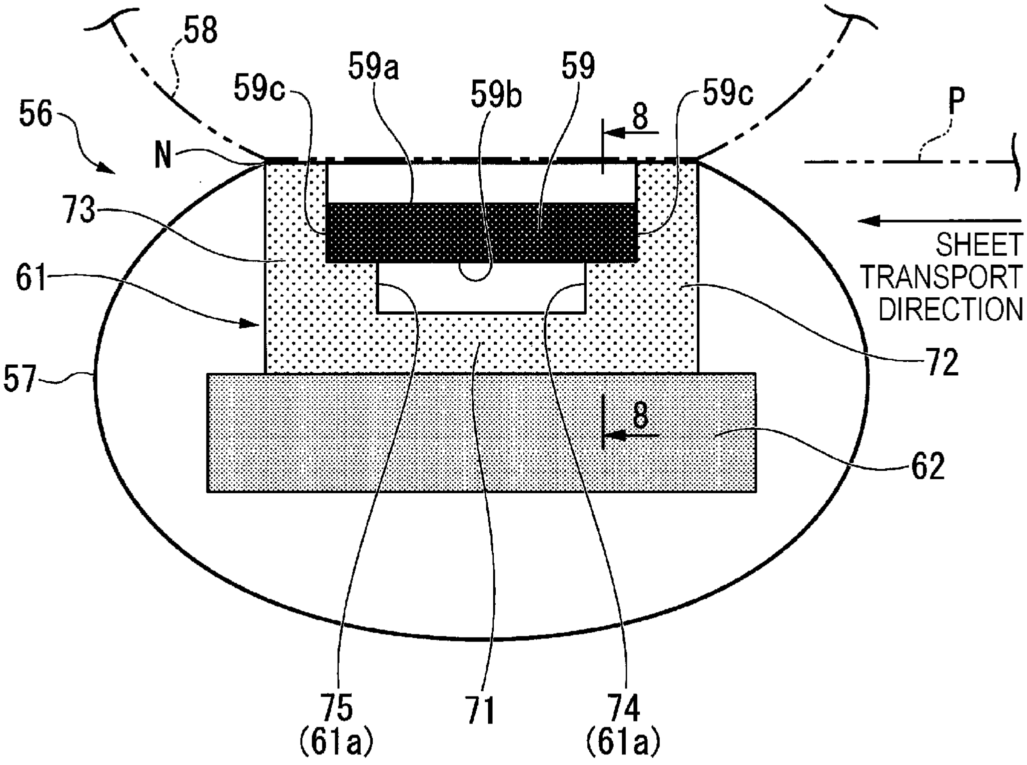
FIG. 4 is a cross-sectional view intersecting with a longitudinal direction of a heater in the fixing device.

FIG. 3 is a schematic view illustrating a configuration example of the fixing unit 56 according to the embodiment, and illustrates the arrangement of heat generating resistor layers (heating resistors) 69*a* to 69*g*, which will be described later, and the connection state between the heat generating resistor layers 69*a* to 69*g* and drive circuits thereof. FIG. 4 a cross-sectional view orthogonal to (intersecting with) the longitudinal direction of a heater 59 in the fixing unit 56 of the embodiment, and illustrates a cross-section of a support region 61*c* described later.

As illustrated in FIGS. 3 and 4, the fixing unit 56 of the embodiment includes a fixing belt (belt) 57, a pressure roller (roller) 58, and the heater (heating unit) 59.

The fixing belt 57 is formed of a material having flexibility and has a thin cylindrical shape. The fixing belt 57 is an endless belt-like member (including a film-like shape). Although not illustrated, the fixing belt 57 includes a cylindrical base and a release layer arranged on the outer peripheral surface of the base. The base is formed of a metal material such as nickel or stainless steel, or a resin material such as polyimide (PI). For the release layer, a tetrafluoroethylene-perfluoroalkyl vinyl ether copolymer (PFA), polytetrafluoroethylene (PTFE) or the like is used. An elastic layer formed of a rubber material such as silicone rubber, foamable silicone rubber, or fluororubber may be interposed between the base and the release layer.

Support members (not illustrated) are fitted to both ends of the fixing belt 57 in the axial direction (hereinafter, simply referred to as the axial direction). The cylindrical portions of the support members are inserted into the ends of the fixing belt 57 in the axial direction to support the fixing belt. The support members hold the shape of both ends of the fixing belt 57 in the axial direction. On the other hand, an intermediate portion of the fixing belt 57 in the axial direction is easily deformed because the support member is not fitted. The fixing belt 57 is rotatable around the axis of the fixing belt 57 while being supported by the support members.

For example, the fixing belt 57 and the pressure roller 58 are arranged side by side along the horizontal surface. The pressure roller 58 is pressed to the fixing belt 57 by a pressing unit (not illustrated) and is in contact with the outer peripheral surface of the fixing belt 57. A nip N is formed at a portion where the pressure roller 58 and the fixing belt 57 are in pressure contact with each other by crushing the surface layer of the pressure roller 58 and the fixing belt 57 with each other. In the nip N, the sheet P is sandwiched between the pressure roller 58 and the fixing belt 57.

The pressure roller 58 is rotationally driven by a drive source such as a motor (not illustrated) provided on the main body 11. When the pressure roller 58 is rotationally driven, the driving force of the pressure roller 58 is transmitted to the fixing belt 57 at the nip N, and the fixing belt 57 is driven to rotate. The sheet P sandwiched in the nip N is transported to the downstream side in the transport direction by the rotation of the pressure roller 58 and the fixing belt 57. A toner image transferred to the sheet P is fixed to the sheet P by the heat of the fixing belt 57. Hereinafter, the transport direction of the sheet P is referred to as a sheet transport direction, and a direction (corresponding to the axial direction of the fixing belt 57) orthogonal to the sheet transport direction is referred to as a sheet width direction.

The heater 59 is arranged on the inner peripheral side of the fixing belt 57 and extends toward the longitudinal direction (to be parallel) in the sheet width direction. The heater 59 has a length that exceeds the full width of the sheet P having the maximum width that can pass through the fixing unit 56. The fixing belt 57 has a width exceeding the length of the heater 59. The fixing belt 57 is heated in a range facing the heater 59.

The heater 59 is formed in a longitudinally extending strip. The heater 59 is arranged with one surface of the front and back surfaces facing the inner peripheral surface of the fixing belt 57 (upper surface in FIG. 4). The heater 59 generates heat under output control of a power supply unit (not illustrated) provided in the main body 11 and heats the fixing belt 57. The heater 59 is held by a holder 61 extending in the longitudinal direction of the heater 59.

As illustrated in FIGS. 3 and 4, the fixing unit 56 of the embodiment heats the fixing belt 57 by a split heater method. On the base of the heater 59 (for example, a ceramic-based heater substrate), the heat generating resistor layers (heating regions, heat generating portions) 69*a* to 69*g* divided in plural (for example, 7) in the direction perpendicular to the sheet transport direction (sheet width direction) are provided.

Here, the fixing unit 56 performs alignment (center alignment) of the sheet P in the sheet width direction so that the center portion of the sheet P in the width direction overlaps with the center portion of the heater 59 in the longitudinal direction (indicated by a line CL in the drawing). That is, the fixing unit 56 transports the sheet P while the center portion of the sheet P in the width direction matches with the center portion CL of the heater 59 in the longitudinal direction. The fixing unit 56 may be configured to perform alignment (side alignment) of the sheet P in the sheet width direction based on one side in the sheet width direction.

Each of the heat generating resistor layers 69*a* to 69*g* is provided with an input side electrode (common electrode) 66 to which an alternating current is applied from an alternating current power supply 65 and output side electrodes (individual electrodes) 67*a* to 67*g*. A switching element of a drive IC 68 is connected to each of the output side electrodes 67*a* to 67*g*. Energization to each of the heat generating resistor layers 69*a* to 69*g* is individually controlled by the drive IC 68. For example, the input side electrode is arranged on the upstream side of the heater 59 in the sheet transport direction. The output side electrodes are arranged on the downstream side of the heater 59 in the sheet transport direction.

Although the common electrode (input side electrode) is arranged on the upstream side in FIG. 3, the common electrode may be arranged on the downstream side. In FIG. 3, although the temperature of each of the heat generating resistor layers 69*a* to 69*g* can be individually controlled, for example, the switching element may be shared by the heat generating resistor layers symmetrical with each other. At this time, the temperature control can be simultaneously performed in the heat generating resistor layers symmetrical with each other. The switching element may be shared by a combination in which the plurality of heat generating resistor layers 69*a* to 69*g* are appropriately combined, and the temperature of the combination may be controlled simultaneously. In FIG. 3, the electrode of each of the heat generating resistor layers 69*a* to 69*g* is arranged in a range of the width of the fixing belt 57 in the sheet width direction. For example, only the electrodes positioned at both ends in the sheet width direction may be arranged outside the range of the width of the fixing belt 57.

As illustrated in FIG. 4, in the cross-sectional view of the heater 59 and the holder 61, the support holder 61 supports the heater 59 by a frame 62 on the inner peripheral side of the fixing belt 57. For example, the holder 61 is formed of a thermosetting resin. The holder 61 supports the heater 59 from the other surface of the front and back surfaces (the lower surface in FIG. 4). Hereinafter, one surface of the front and back surfaces of the heater 59 may be referred to as a heater front surface 59*a* and the other surface of the front and back surfaces (supported surface) may be referred to as a heater back surface 59*b*.

Figure 9:
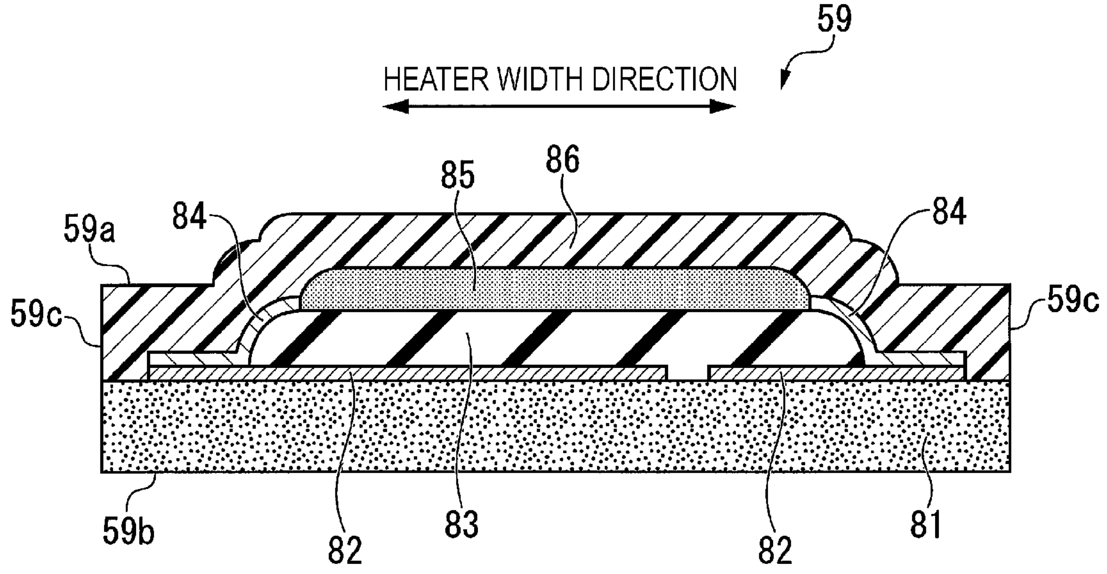
FIG. 9 is a cross-sectional view illustrating the heater of the fixing device in a direction intersecting with the longitudinal direction.

The heater front surface 59*a* is a heating surface in which the heat generating resistor layers 69*a* to 69*g* are arranged under a protective layer (refer to FIG. 9). The heater back surface 59*b* is a heat transfer surface through which the heat of the heat generating resistor layers 69*a* to 69*g* is transmitted through the thickness of the heater 59. When the entire heater back surface 59*b* comes in contact with the holder 61, the heat of the heater 59 is easily transmitted to the holder 61. In this case, the temperature rising performance of the heater 59 is reduced, and the holder 61 formed of resin is easily affected by heat.

The heater 59 is supported in contact with the holder 61 on both the nip upstream side and the nip downstream side. The heater 59 is not in contact with the holder 61 between the nip upstream side and the nip downstream side, and thus prevents heat transfer to the holder 61.

The holder 61 includes a bottom wall portion 71 supported by the frame 62, an upstream side wall portion 72 rising from the nip upstream side of the bottom wall portion 71, and a downstream side wall portion 73 rising from the nip downstream side of the bottom wall portion 71. The holder 61 has a U shape in which the bottom wall portion 71, the upstream side wall portion 72, and the downstream side wall portion 73 are integrated in a cross-sectional view of FIG. 4. The heater 59 is supported by the holder 61 so as to be fitted between the upstream side wall portion 72 and the downstream side wall portion 73.

The holder 61 includes a first rib (protrusion) 74 that supports the upstream side of the heater 59 on the nip upstream side, and a second rib (protrusion) 75 that supports the downstream side of the heater 59 on the nip downstream side. The first rib 74 and the second rib 75 rise from the bottom wall portion 71 of the holder 61 toward the heater 59 so as to be orthogonal to the front and back surfaces of the heater 59. The rising height of the first rib 74 and the second rib 75 is lower than the rising height of the upstream side wall portion 72 and the downstream side wall portion 73. In the embodiment, the first rib 74 is integrated with the upstream side wall portion 72 of the holder 61, and the second rib 75 is integrated with the downstream side wall portion 73 of the holder 61.

The first rib 74 and the second rib 75 extend along the longitudinal direction (sheet width direction) of the heater 59. The first rib 74 and the second rib 75 extend over the entire length of the heater 59. The first rib 74 and the second rib 75 come into contact with and support both sides of the nip upstream side and the nip downstream side of the heater back surface 59*b* from below. Both side edges 59*c* of the heater 59 in the sheet transport direction are in close proximity to or in contact with the inner wall surfaces of the upstream side wall portion 72 and the downstream side wall portion 73. The heater 59 is fixed to the first rib 74 and the second rib 75 of the holder 61 and the upstream side wall portion 72 and the downstream side wall portion 73. For example, the heater 59 is bonded to the holder 61 with a Si-based adhesive.

The holder 61 is separated from the heater back surface 59*b* between the first rib 74 and the second rib 75. A rib that partially supports the heater back surface 59*b* or the like may be provided between the first rib 74 and the second rib 75 of the holder 61. The holder 61 may be provided with a portion avoiding the heater back surface 59*b* between the nip upstream side and the nip downstream side.

The first rib 74 and the second rib 75 constitute a support portion 61*a* that comes into contact with the heater back surface 59*b* and supports the heater 59. The first rib 74 and the second rib 75 are partially cut out in the longitudinal direction of the heater 59. That is, in the first rib 74 and the second rib 75, notches 74*a* and 74*a* (retraction portions 61*b*, refer to FIG. 8), which do not come into contact with the heater back surface 59*b*, are partially formed. The retraction portions 61*b* not come into contact with the heater back surface 59*b* are not limited to the notches 74*a* and 74*a* formed in the ribs, may be a hole, a recess, or the like in which the contact with the heater back surface 59*b* is avoided. When the retraction portion 61*b* is partial, the support rigidity of the heater 59 is secured.

In the holder 61, the support regions 61*c* including the support portions 61*a* and retraction regions 61*d* including the retraction portions 61*b* (retraction portions 61*b*, refer to FIG. 8) are mixed in the longitudinal direction of the heater 59. The retraction region 61*d* is provided at a position avoiding the support region 61*c* in the longitudinal direction of the heater 59. For example, the holder 61 does not come into contact with the heater back surface 59_b_ in the retraction region 61_d_.

The holder 61 is not limited to the configuration in which the holder does not completely come into contact with the heater back surface 59_b_ in the retraction region 61_d_, and may adopt a configuration in which the holder comes into contact with the heater back surface 59_b_ with a small area in the retraction region 61_d_. The holder 61 may have a configuration in which the contact area with the heater back surface 59_b_ is smaller than the support region 61_c_ in the retraction region 61_d_. In this case, since the decrease in support rigidity of the heater 59 is prevented, the pitch at which the support portions 61_a_ are provided may be increased in the longitudinal direction of the heater 59. The holder 61 may cut out at least one of the upstream side wall portion 72 and the downstream side wall portion 73 in the retraction region 61_d_. At this time, at least one of the side edges 59_c_ of the heater 59 in the sheet transport direction does not come into contact with the holder 61.

Figure 5:
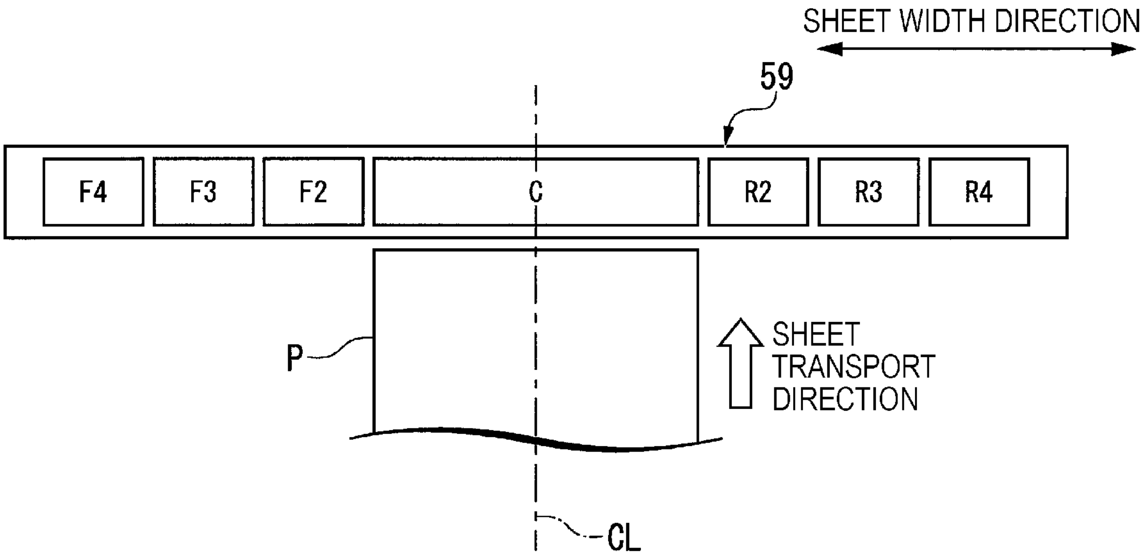
FIG. 5 is a first schematic view illustrating a positional relationship between the fixing device and a sheet to be transported.

FIG. 5 is a first schematic view illustrating a positional relationship between the fixing unit 56 of the embodiment and the sheet P to be transported.

As illustrated in FIG. 5, the heater 59 includes the heat generating resistor layers 69_a_ to 69_g_ divided into 7 in the sheet width direction. Each of the heat generating resistor layers 69_a_ to 69_g_ is indicated by reference symbols F4, F3, F2, C, R2, R3, and R4 in order from the left side in FIG. 5.

First, a case where the sheet P having the same width as the heat generating resistor layer C at the center in the sheet width direction is transported is assumed.

In this case, the heater 59 is controlled such that the heat generating resistor layer C reaches a fixable temperature (for example, 160° C. at the surface of the fixing belt 57).

Since the heat generating resistor layers F2 and R2 on both sides of the heat generating resistor layer C are positioned on the outer side of the sheet width, the temperature can be made lower than that of the heat generating resistor layer C. Depending on the basis weight of the sheet (paper) P and the external environment, and further, the number of sheets to be passed, the heat generating resistor layers F2 and R2 may not be required to generate heat.

The heat generating resistor layers F4, F3, R3, and R4 on the outer side in the width direction do not need to generate heat because the heat generating resistor layers are far from the sheet end. When the heater 59 is controlled as described above, the heater 59 is not fully heated in a region through which the sheet P does not pass in the sheet width direction (non-sheet passing region). Therefore, even when continuous paper passing is performed, the temperature of the heater back side (including the meaning of the holder 61) does not locally reach the abnormal temperature (250° C. or higher).

In the fixing unit 56 of the embodiment, when the sheet P is transported, only the heat resistor layer in a region through which the sheet P passes in the sheet width direction (sheet passing region) is selectively energized and heated. In the embodiment, before the sheet P is transported to the fixing unit 56, the sheet width is set. For example, the setting of the sheet width may be automatically performed based on the detection result of a sensor provided in the sheet transport path in addition to the user operation.

Figure 6:
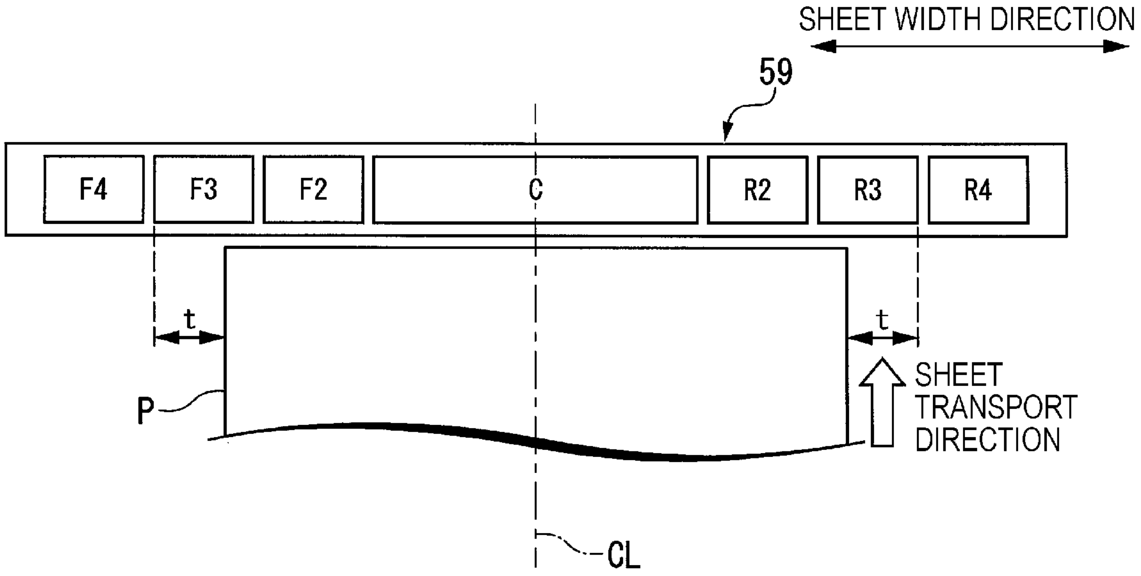
FIG. 6 is a second schematic view illustrating a positional relationship between the fixing device and a sheet to be transported.

FIG. 6 is a second schematic view illustrating a positional relationship between the fixing unit 56 of the embodiment and the sheet P to be transported.

FIG. 6 illustrates a case where the width of the sheet P to be transported is wider than the width of the sheet in FIG. 5, and the sheet P overlaps with the heat generating resistor layers F3 and R3. In this case, the heat generating resistor layer C at the center in the sheet width direction and the heat generating resistor layers F2 and R2 on both sides are controlled to a fixable temperature (160° C.). The heat generating resistor layers F3 and R3 also need to be controlled to the fixable temperature (160° C.). In a case where the heat generating resistor layers F3 and R3 partially overlap with the sheet P, in the heat generating resistor layers F3 and R3, a region through which the sheet P passes (heat generating portion sheet passing region) and a non-sheet passing region through which the sheet P does not pass (heat generating portion non-sheet passing region) are present.

In the heat generating resistor layers F3 and R3 controlled to the fixable temperature (160° C.), the heater back side of the heat generating portion non-sheet passing region is overheated. This is because heat is not absorbed by the sheet P in the heat generating portion non-sheet passing region, and therefore, when continuous paper passing is performed, the temperature reaches the abnormal temperature (250° C. or higher) in a relatively small number of sheets. As a result, the holder 61 in contact with the heater back side of the heat generating portion non-sheet passing region, which is locally overheated, also reaches the abnormal temperature (250° C. or higher). When the holder 61 reaches the abnormal temperature, there is a possibility that the resin forming the holder 61 may be thermally deformed. In this state, depending on the sheet width, a plurality of patterns may be formed in a case where the heat generating resistor layers F2 and R2 are overheated, a case where the heat generating resistor layers F4 and R5 are overheated, and the like. The width of the heat generating portion non-sheet passing region also differs depending on the sheet width.

Figure 7:
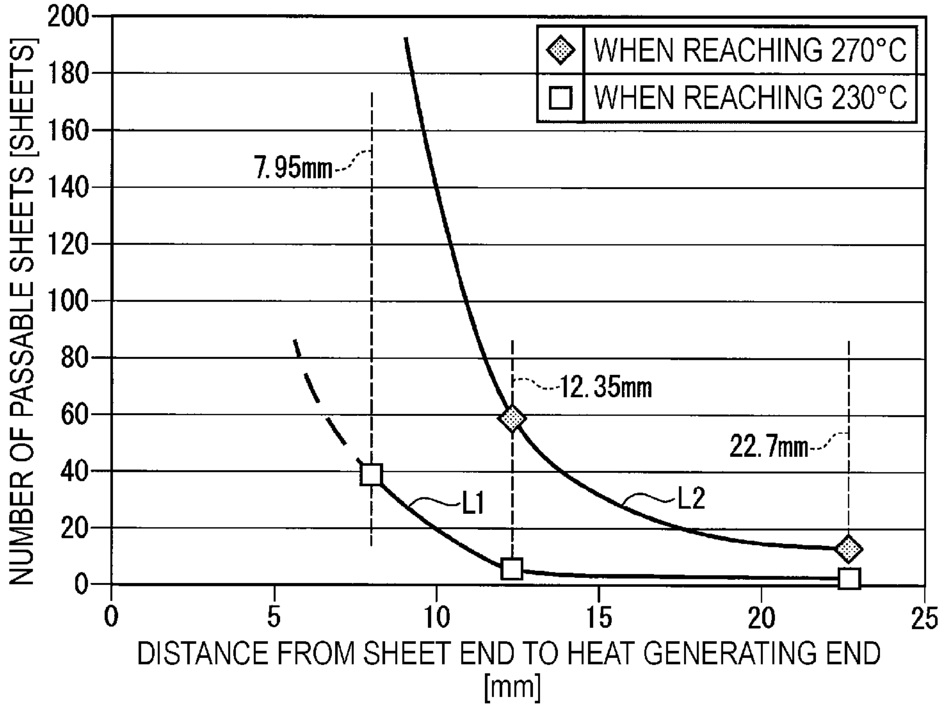
FIG. 7 is a graph illustrating a correlation between a distance from an outer end of a sheet to an outer end of a heat generating portion and the number of sheets that can be passed in the fixing device.

FIG. 7 is a graph illustrating the correlation between a distance t from the outer end of the sheet P to the outer end of the heat generating portion and the number of sheets that can be passed in the fixing unit 56 of the embodiment. The graph illustrates the number of sheets that can be passed with reference to the heat generating portion (the energized heat generating resistor layer) in which the heat generating portion non-sheet passing region is present.

In FIG. 7, test results when the temperature of the heater back side in the heat generating portion reaches 230° C. and when the temperature of the heater back side reaches 270° C. are respectively plotted. A line L1 in the drawing is a line connecting the plots when the temperature of the heater back side reaches 230° C. and a line L2 in the drawing is a line connecting the plots when the temperature of the heater back side reaches 270° C., respectively.

As illustrated in FIG. 7, when the distance t is 22.7 mm, the temperature of the heater back side reaches 230° C. when the number of sheets that can be continuously passed is 2. When the number of sheets that can be continuously passed is 12, the temperature of the heater back side reaches 270° C. That is, "the number of sheets that can be continuously passed" refers to the number of sheets that can be passes until the temperature of the heater back side reaches a determined temperature.

At a distance t of 12.35 mm, the temperature of the heater back side reaches 230° C. when the number of sheets that can be continuously passed is 7, and the temperature of the heater back side reaches 270° C. when the number of sheets that can be continuously passed is 58.

At a distance t of 7.95 mm, the temperature of the heater back side reaches 230° C. when the number of sheets that can be continuously passed is 38, but the temperature of the heater back side does not reach 270° C. when the number of sheets that can be continuously passed is increased and the temperature of the heater back side is saturated near 250° C.

That is, regarding the relationship between the abnormal temperature of the heater back side (250° C. or higher) and the width of the heat generating portion non-sheet passing region (distance t), the width of the non-sheet passing region is preferably 8 mm or less. When the width of the non-sheet passing region is 8 mm or less, the temperature of the heater back side is saturated before the temperature reaches the abnormal temperature.

Therefore, it is preferable that the distance t from the outer end of the sheet P to the outer end of the heat generating portion is short. It is found that the temperature of the heater back side on the outer side in the sheet width direction (heat generating portion non-sheet passing region) in the heat generating portion easily becomes higher than the temperature of the heater back side on the inner side (heat generating portion sheet passing region) in the sheet width direction in the heat generating portion (the energized heat generating resistor layer).

Figure 8:
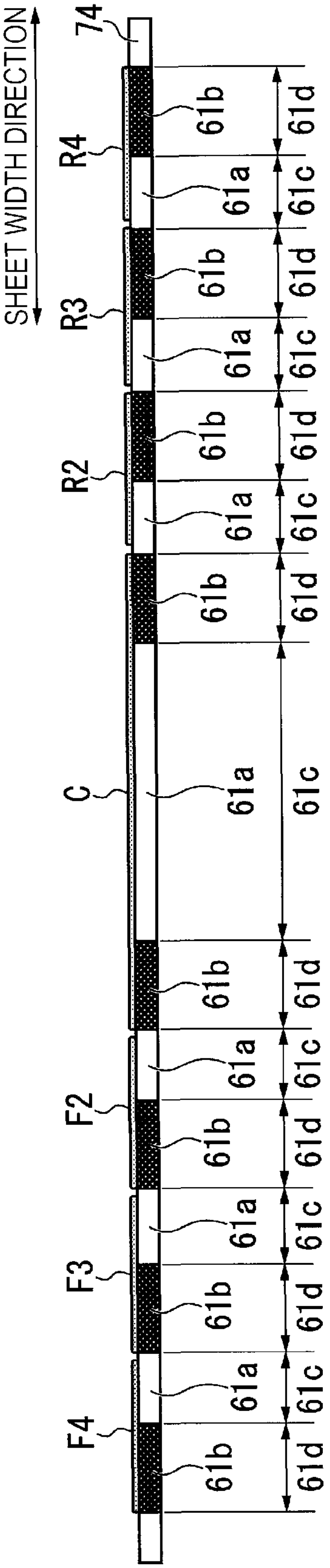
FIG. 8 is a cross-sectional view illustrating a positional relationship between the heat generating portion in the fixing device and a support portion and a retraction portion in a holder, taken along the longitudinal direction of the heater.

FIG. 8 is a cross-sectional view illustrating a positional relationship between the heat generating portion of the fixing unit 56 of the embodiment and the support portion 61*a* and the retraction portion 61*b* of the holder 61, taken along the longitudinal direction of the heater 59.

As illustrated in FIG. 8, the retraction portions 61*b* (notches 74*a* and 74*a*) of the holder 61 are arranged at positions overlapping with the outer sides of each of the heat generating resistor layers F4, F3, F2, C, R2, R3, and R4 (outer side overlap positions) in the sheet width direction. The temperature of the outer side overlap position is easily increased. The retraction portion 61*b* in which the contact area between the holder 61 and the heater back surface 59*b* is reduced is arranged at the outer side overlap position. Thus, at the position where the temperature of the heater back side is easily increased, heat transfer from the heater 59 to the holder 61 is prevented and the temperature rise in the holder 61 is prevented.

The configuration in which the retraction portion 61*b* of the holder 61 is arranged at the outer side overlap position may be applied to only a pair of symmetrical heat generating resistor layers among the plurality of heat generating resistor layers. The configuration may be applied to a plurality of left and right pairs of heat generating resistor layers. When the configuration is applied to the plurality of pairs of heat generating resistor layers, the positions of the retraction portion 61*b* and the support portion 61*a* in the sheet width direction may be the same or different between the pair of heat generating resistor layers. The retraction portion 61*b* may not be provided corresponding to all the heat generating resistor layers.

Thus, at the position where the temperature of the heater back side easily reaches the abnormal temperature (outer side overlap position), the retracting portion 61*b* is provided with a reduced contact area with the heater back surface 59*b* in the holder 61. Thus, it is possible to prevent the holder 61 from being overheated to prevent thermal deformation of the holder 61 and to increase the number of sheets that can be continuously passed.

FIG. 9 is a cross-sectional view of the heater 59 of the fixing unit 56 of the embodiment in a direction intersecting with (orthogonal to) the longitudinal direction.

As illustrated in FIG. 9, the heater 59 includes a substrate, individual electrode layers, an insulating layer, common electrode layers, a heat generating layer, and a protective layer.

The substrate constitutes the back surface side of the heater 59. For example, the substrate is a ceramic substrate. The individual electrode layer is constituted of a wiring pattern printed on the ceramic substrate. The individual electrode layers are formed while being separated and insulated from each other on the substrate.

The insulating layer is provided between the substrate and the heat generating layer.

The common electrode layer is provided on the upstream side and the downstream side in the sheet transport direction in FIG. 9. Hereinafter, the direction parallel with the sheet width direction in the heater 59 is referred to as a heater width direction. In the pair of common electrode layers, the portions on the outer side in the heater width direction are respectively connected to the upstream side and downstream side individual electrode layers in the sheet transport direction.

The heat generating layer is provided between the portions of the pair of common electrode layers in the heater width direction. For example, the heat generating layer is constituted of a nickel chrome alloy.

The protective layer covers the surface of the heater 59. The protective layer covers all of the individual electrode layers, the insulating layer, the common electrode layers, and the heat generating layer on the substrate. For example, the protective layer is constituted of $Si_3N_4$ or the like.

The heater 59 is configured such that the substrate, the individual electrode layers, the insulating layer, the common electrode layers, the heat generating layer, and the protective layer are laminated in order from the lower surface side.

Figure 10:
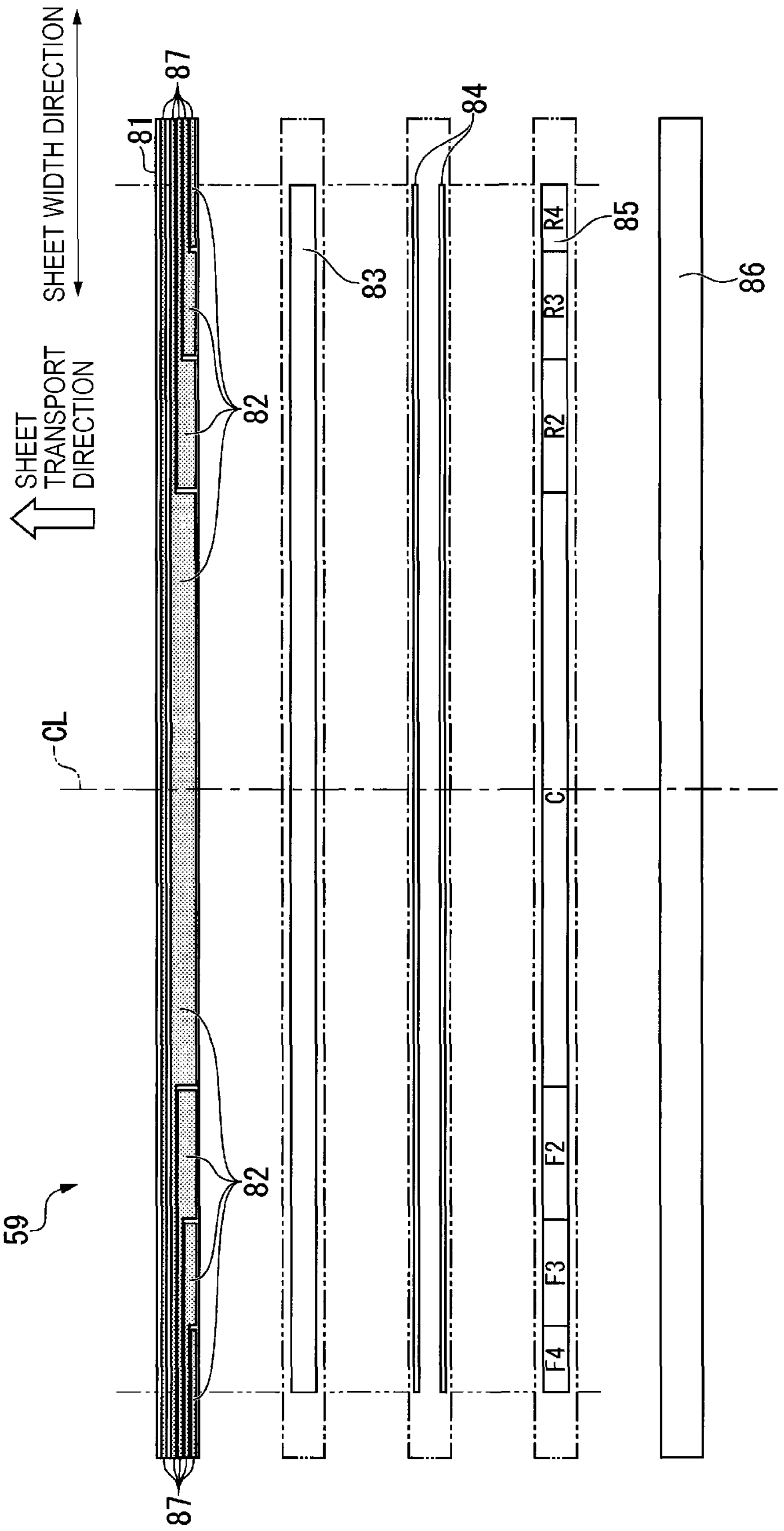
FIG. 10 is an exploded plan view of the heater of the fixing device.

FIG. 10 is an exploded plan view of the heater 59 of the fixing unit 56 of the embodiment.

As illustrated in FIG. 10, the heat generating layer is divided into a plurality of heating regions (heat generating resistor layers F4, F3, F2, C, R2, R3, and R4) aligned in the longitudinal direction of the heater 59. The plurality of heating regions is connected to the drive IC 68 while being insulated from each other via a plurality of individual electrode layers (output side electrodes) and the like.

The plurality of heating regions is switched between heating and non-heating (energization and non-energization) according to the width of the sheet P to be transported. Switching between heating and non-heating of the plurality of heating regions is controlled by the main control unit 53. The main control unit 53 switches between heating and non-heating of each heating regions by selectively opening and closing the switching element of the drive IC 68.

The plurality of heating regions is arranged in line symmetry with the center portion CL of the heater 59 in the longitudinal direction as the symmetry axis. On both sides of the heater 59 in the longitudinal direction, a plurality of power feed terminals are provided corresponding to each of the plurality of heating regions. The plurality of power feed terminals are provided for, in addition to the heat generating resistor layer C, each of the pair of heat generating resistor layers on the outer side of the heater 59 in the longitudinal direction (the pair of heat generating resistor layers F4 and R4, the pair of heat generating resistor layers F3 and R3, and the pair of heat generating resistor layers F2 and R2).

The plurality of power feed terminals are provided at the left and right ends of the heater 59 in FIG. 10 with the center portion CL of the heater 59 in the longitudinal direction as a boundary. The power feed terminal provided at the left end of the heater 59 in the drawing is drawn out from the individual electrode layer positioned on one side (left in the drawing) of the heater 59 in the longitudinal direction to one side in the longitudinal direction (left side). The power feed terminal provided at the right end of the heater 59 in the drawing is drawn out from the individual electrode layer positioned on the other side (right side in the drawing) of the heater 59 in the longitudinal direction toward the other side in the longitudinal direction (right side).

According to this configuration, the wiring length is short compared to the case where the plurality of heat generating resistor layers are energized from only one side (or the other side) of the heater 59 in the longitudinal direction. For this reason, the voltage drop of the alternating current is prevented, and heating of the heat generating resistor layer becomes satisfactory. Since the heating regions are arranged symmetrically in the longitudinal direction of the heater 59, it is easy to balance the voltage to the heating regions in the longitudinal direction of the heater 59. Therefore, the fixing belt 57 can be easily heated uniformly in the longitudinal direction of the heater 59.

The fixing unit 56 of the embodiment is formed in a cylindrical shape, rotates in the circumferential direction to transport the sheet P, and includes the fixing belt 57 that applies heat to the sheet P, the heater 59 that is arranged on the inner side of the fixing belt 57, extends in a predetermined longitudinal direction, and heats the fixing belt 57, and the holder 61 that extends in the longitudinal direction of the heater 59 and holds the heater 59. The holder 61 includes the support portion 61*a* that comes into contact with the heater 59 and supports the heater 59, and the retraction portion 61*b* that is provided at a position avoiding the support portion 61*a* in the longitudinal direction of the heater 59, includes a smaller contact area with the heater 59 than the contact area between the support portion 61*a* and the heater 59, or does not come into contact with the heater 59.

According to this configuration, in the holder 61 that holds the heater 59, the support portion 61*a* that holds the heater 59 and the retraction portion 61*b* in which the heater 59 is retracted from the support portion 61*a* are mixed in the longitudinal direction of the heater 59. Therefore, at the portion in which the retraction portion 61*b* is provided in the holder 61, heat transfer from the heater 59 is prevented. Thus, the temperature rise in the holder 61 can be prevented. Since the retraction portion 61*b* that has the contact area with the heater 59 smaller than contact area between the support portion 61*a* and the heater, or does not come into contact with the heater 59 is provided only in the holder 61, it is possible to prevent an increase in the number of parts of the fixing unit 56.

That is, it is possible to provide the fixing unit 56 capable of preventing a temperature rise in the holder 61 that holds the heater 59 while preventing an increase in the number of parts.

In the fixing unit 56 of the embodiment, the support portion 61*a* includes the ribs 74 and 75 extending in the longitudinal direction and the retraction portion 61*b* includes the notches 74*a* and 74*a* for avoiding the heater 59 formed in the ribs 74 and 75.

According to this configuration, since the support portion 61*a* and the retraction portion 61*b* are simply configured by the ribs 74 and 75 and the notches 74*a* and 74*a*, it is possible to prevent a temperature rise in the holder 61 while preventing an increase in the number of parts.

In the fixing unit 56 of the embodiment, the heater 59 includes the plurality of heating regions (heat generating resistor layers F4, F3, F2, C, R2, R3, and R4) aligned in the longitudinal direction, and the plurality of heating regions are switched between heating and non-heating according to the sheet width of the sheet P to be transported.

According to this configuration, since the on or off of the plurality of heating regions in the heater 59 is switched according to the sheet width, the overheating of the region with which the sheet P does not come into contact can be prevented and the temperature rise in the holder 61 can be efficiently prevented.

In the fixing unit 56 of the embodiment, the sheet P is transported such that the center portion of the sheet P in the width direction overlaps with the center portion CL of the heater 59 in the longitudinal direction, and the plurality of heating regions are arranged in line symmetry with the center portion CL in the longitudinal direction as the symmetry axis.

According to this configuration, by feeding power to the plurality of heating regions aligned in the longitudinal direction of the heater 59 from both sides in the longitudinal direction, it is easy to prevent the influence of voltage drop on the power feeding to each heating regions. Thereby, compared to the case where power is fed to each heating region from only one side in the longitudinal direction, it is possible to easily prevent heating unevenness among the plurality of heating regions.

In the fixing unit 56 of the embodiment, the notches 74*a* and 74*a* are arranged on the outer side in the longitudinal direction in the heating region.

According to this configuration, the heat transfer from the outer side of the heating region of the heater 59 in the longitudinal direction (outer side in the sheet width direction) to the holder 61 is prevented. The outer side of the heating region of the heater 59 in the longitudinal direction projects outward from the outer end of the sheet P to heat the sheet P over the entire width. Therefore, the non-sheet passing region is easily formed on the outer side of the heating region of the heater 59. The non-sheet passing region becomes an overheated region at the time of continuous paper passing. The heat conduction from the overheated region of the heater 59 to the holder 61 is prevented by arranging the notches 74*a* and 74*a* (retraction portions 61*b*) of the holder 61 so as to correspond to the overheated region. Thus, it is possible to prevent a temperature rise in the holder 61.

The image forming apparatus 1 of the embodiment includes the printer unit 17 that forms an image on the sheet P, and the fixing unit 56 according to any one of the exemplary embodiments, which fixes the image on the sheet P.

According to this configuration, it is possible to provide the image forming apparatus 1 capable of preventing a temperature rise in the holder 61 that holds the heater 59 while preventing an increase in the number of parts.

According to at least one of the exemplary embodiments, by providing the fixing belt 57, the heater 59, and the holder 61, and providing the support portion 61*a* and the retraction portion 61*b* in the holder 61, it is possible to provide a fixing device and an image forming apparatus capable of preventing a temperature rise in the holder 61 that holds the heater 59 while preventing an increase in the number of parts.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing device, comprising:

a belt configured to rotate in a transport direction;

a heater configured to heat the belt, the heater comprising a plurality of heating regions in a perpendicular direction perpendicular to the transport direction; and a holder comprising:

a support portion that contacts the heater to support the heater, and a retraction portion that overlaps with an outer side, in the perpendicular direction, of at least one of the plurality of the heating regions in a smaller area than a contact area between the support portion and the heater, and at an area other than the contact area, wherein the plurality of heating regions are discrete regions that are non-continuous with one another.

2. The fixing device according to claim 1, wherein the holder further comprises:

a second support portion that contacts the heater to support the heater, and a second retraction portion that overlaps with an outer side, in the perpendicular direction, of at least other one of the plurality of the heating regions in a smaller area than a second contact area between the second support portion and the heater at an area other than the second contact area.

3. The fixing device according to claim 1, wherein the heater includes a substrate having a first side where a first heat generating resistor and a second heat generating resistor are disposed and a second side which is opposite side against the first side, and wherein the second side contacts with the support portion.

4. The fixing device according to claim 1, wherein the heater comprises a first heating region, a second heating region, and a third heating region, wherein the first heating region is at a side of the second heating region in a direction perpendicular to the transport direction, and wherein the third heating region is at the other side of the second heating region in a direction perpendicular to the transport direction.

5. The fixing device according to claim 4, wherein the end of the third heating region contacts the support portion at a side in the direction perpendicular to the transport direction, and wherein the end of the third heating region faces a non-contacting portion at the other side in the direction perpendicular to the transport direction.

6. The fixing device according to claim 1, wherein the plurality of heating regions comprise a first heating region and a second heating region that are configured to be selectively powered according to a sheet width of the sheet.

7. A fixing device, comprising:

a belt configured to rotate in a transport direction;

a heater configured to heat the belt, the heater comprising a plurality of heating regions in a perpendicular direction perpendicular to the transport direction; and a holder comprising:

a support portion that contacts the heater to support the heater, and a non-contacting portion that overlaps with an outer side, in the perpendicular direction, of at least one of the plurality of the heating regions in a smaller area than a contact area between the support portion and the heater, and at an area other than the contact area, wherein the plurality of heating regions are discrete regions that are non-continuous with one another.

8. The fixing device according to claim 7, wherein the holder further comprises:

a second support portion that contacts the heater to support the heater, and a second retraction portion that overlaps with an outer side, in the perpendicular direction, of at least other one of the plurality of the heating regions in a smaller area than a second contact area between the second support portion and the heater at an area other than the second contact area.

9. The fixing device according to claim 7, wherein the heater includes a substrate having a first side where a first heat generating resistor and a second heat generating resistor are disposed and a second side which is opposite side against the first side, and wherein the second side contacts with the support portion.

10. The fixing device according to claim 7, wherein the heater comprises a first heating region, a second heating region, and a third heating region, wherein the first heating region is at a side of the second heating region in a direction perpendicular to the transport direction, and wherein the third heating region is at the other side of the second heating region in a direction perpendicular to the transport direction.

11. The fixing device according to claim 10, wherein the end of the third heating region contacts the support portion at a side in the direction perpendicular to the transport direction, and wherein the end of the third heating region faces a non-contacting portion at the other side in the direction perpendicular to the transport direction.

12. The fixing device according to claim 7, wherein the plurality of heating regions comprise a first heating region and a second heating region that are configured to be selectively powered according to a sheet width of the sheet.

13. An image forming apparatus, comprising:

an image forming unit that forms an image on a recording medium; and a fixing device comprising:

a belt configured to rotate to in a transport direction;

a heater configured to heat the belt, the heater comprising a plurality of heating regions in a perpendicular direction perpendicular to the transport direction; and a holder comprising:

a support portion that contacts the heater to support the heater, and a retraction portion that overlaps with an outer side, in the perpendicular direction, of at least one of the plurality of the heating regions, in a smaller area than a contact area between the support portion and the heater, and at an area other than the contact area, wherein the holder comprises a plurality of support portions, including the support portion, that contact the heater to support the heater and that are spaced apart along the perpendicular direction by a plurality of retraction portions of the holder, including the retraction portion, wherein the plurality of heating regions are spaced apart by spaces along the perpendicular direction, and wherein the plurality of retraction portions overlap with the plurality of heating regions and not with spaces between the plurality of heating regions.

14. The image forming apparatus according to claim 13, wherein the holder further comprises:

a second support portion that contacts the heater to support the heater, and a second retraction portion that overlaps with an outer side, in the perpendicular direction, of at least other one of the plurality of the heating regions in a smaller area than a second contact area between the second support portion and the heater at an area other than the second contact area.

15. The image forming apparatus according to claim 13, wherein the heater includes a substrate having a first side where a first heat generating resistor and a second heat generating resistor are disposed and a second side which is opposite side against the first side, and wherein the second side contacts with the support portion.

16. The image forming apparatus according to claim 13, wherein the heater comprises a first heating region, a second heating region, and a third heating region, wherein the first heating region is at a side of the second heating region in a direction perpendicular to the transport direction, and wherein the third heating region is at the other side of the second heating region in a direction perpendicular to the transport direction.

17. The image forming apparatus according to claim 16, wherein the end of the third heating region contacts the support portion at a side in the direction perpendicular to the transport direction, and wherein the end of the third heating region faces a non-contacting portion at the other side in the direction perpendicular to the transport direction.

18. The image forming apparatus according to claim 13, wherein the plurality of heating regions comprise a first heating region and a second heating region that are configured to be selectively powered according to a sheet width of the sheet.

19. The fixing device according to claim 13, wherein the plurality of heating regions are discrete regions that are non-continuous with one another.

20. The fixing device according to claim 1, wherein the holder comprises a plurality of support portions, including the support portion, that contact the heater to support the heater and that are spaced apart along the perpendicular direction by a plurality of retraction portions of the holder, including the retraction portion, wherein the plurality of heating regions are spaced apart by spaces along the perpendicular direction, and wherein the plurality of retraction portions overlap with the plurality of heating regions and not with spaces between the plurality of heating regions.

* * * * *